(12) United States Patent
Busse et al.

(10) Patent No.: US 7,407,389 B2
(45) Date of Patent: Aug. 5, 2008

(54) DISTRIBUTION CONNECTING MODULE

(75) Inventors: Ralf-Dieter Busse, Waldesruh (DE); Joachim Stark, Berlin (DE); Harald Klein, Berlin (DE); Antony Nijhuis, Modautal-Brandau (DE)

(73) Assignee: ADC GmbH, Berlin (DE)

( * ) Notice: Subject to any disclaimer, the term of this patent is extended or adjusted under 35 U.S.C. 154(b) by 14 days.

(21) Appl. No.: 10/569,306

(22) PCT Filed: Aug. 12, 2004

(86) PCT No.: PCT/EP2004/009002
§ 371 (c)(1),
(2), (4) Date: Feb. 21, 2006

(87) PCT Pub. No.: WO2005/029647
PCT Pub. Date: Mar. 31, 2005

(65) Prior Publication Data
US 2006/0286824 A1   Dec. 21, 2006

(30) Foreign Application Priority Data
Aug. 29, 2003 (DE) ................................ 103 39 844

(51) Int. Cl.
*H05K 1/00* (2006.01)
(52) U.S. Cl. ..................................... 439/76.1; 439/719
(58) Field of Classification Search ................ 439/76.1, 439/76.2, 404, 417, 362, 719; 361/736, 785
See application file for complete search history.

(56) References Cited

U.S. PATENT DOCUMENTS

| 3,195,600 A | 7/1965 | Middleton, Jr. |
| 3,662,321 A | 5/1972 | Bury |
| 3,668,476 A * | 6/1972 | Wrabel et al. ............... 361/785 |

(Continued)

FOREIGN PATENT DOCUMENTS

DE    9306970 U    7/1993

(Continued)

OTHER PUBLICATIONS

Certified Translation of DE20120690U1, 27 Pages.

(Continued)

*Primary Examiner*—Neil Abrams
(74) *Attorney, Agent, or Firm*—Merchant & Gould P.C.

(57) ABSTRACT

The distribution connecting module for telecommunications and data systems technology, comprises a housing inside of which input and output contacts for connecting lines and wires are placed, said contacts being accessible from the exterior. The housing is provided with a cavity inside of which at least one printed circuit board is placed. The input and output contacts are situated on the opposing faces of the housing. The input contacts are provided in the form of at least one connector strip with insulation displacement contacts. The input and output contacts can be detachably connected to the printed circuit board. The connector strip supporting the input contacts is detachably connected to the housing via a front part. The insulation displacement contacts are connected to the printed circuit board via fork contacts. The connection between the front part and the housing is such that when the connection is released, the connector strip, which is connected to the front part, is, together with the fork contacts, moved away from the printed circuit board.

37 Claims, 7 Drawing Sheets

U.S. PATENT DOCUMENTS

| | | | |
|---|---|---|---|
| 4,566,660 A | | 1/1986 | Anscher et al. |
| 4,729,738 A | * | 3/1988 | Heng et al. ................. 439/395 |
| 4,830,625 A | * | 5/1989 | Vignoli ...................... 439/404 |
| 5,150,282 A | * | 9/1992 | Tomura et al. .............. 361/818 |
| 6,217,368 B1 | * | 4/2001 | Baron et al. ................ 439/378 |
| 6,994,582 B1 | * | 2/2006 | Carney et al. .............. 439/404 |
| 2003/0156389 A1 | | 8/2003 | Busse et al. |

FOREIGN PATENT DOCUMENTS

| | | |
|---|---|---|
| DE | 4313362 A1 | 11/1993 |
| DE | 199 45 412 | 3/2000 |
| DE | 100 29 649 | 1/2002 |
| DE | 201 20 690 | 3/2003 |
| EP | 0 262 482 | 4/1988 |
| EP | 0 661 777 | 7/1995 |
| EP | 0 671 856 | 9/1995 |
| WO | WO 87/05776 | 9/1987 |
| WO | WO 01/97339 | 12/2001 |

OTHER PUBLICATIONS

Certified Translation of EP0671856A1, 12 Pages.

* cited by examiner

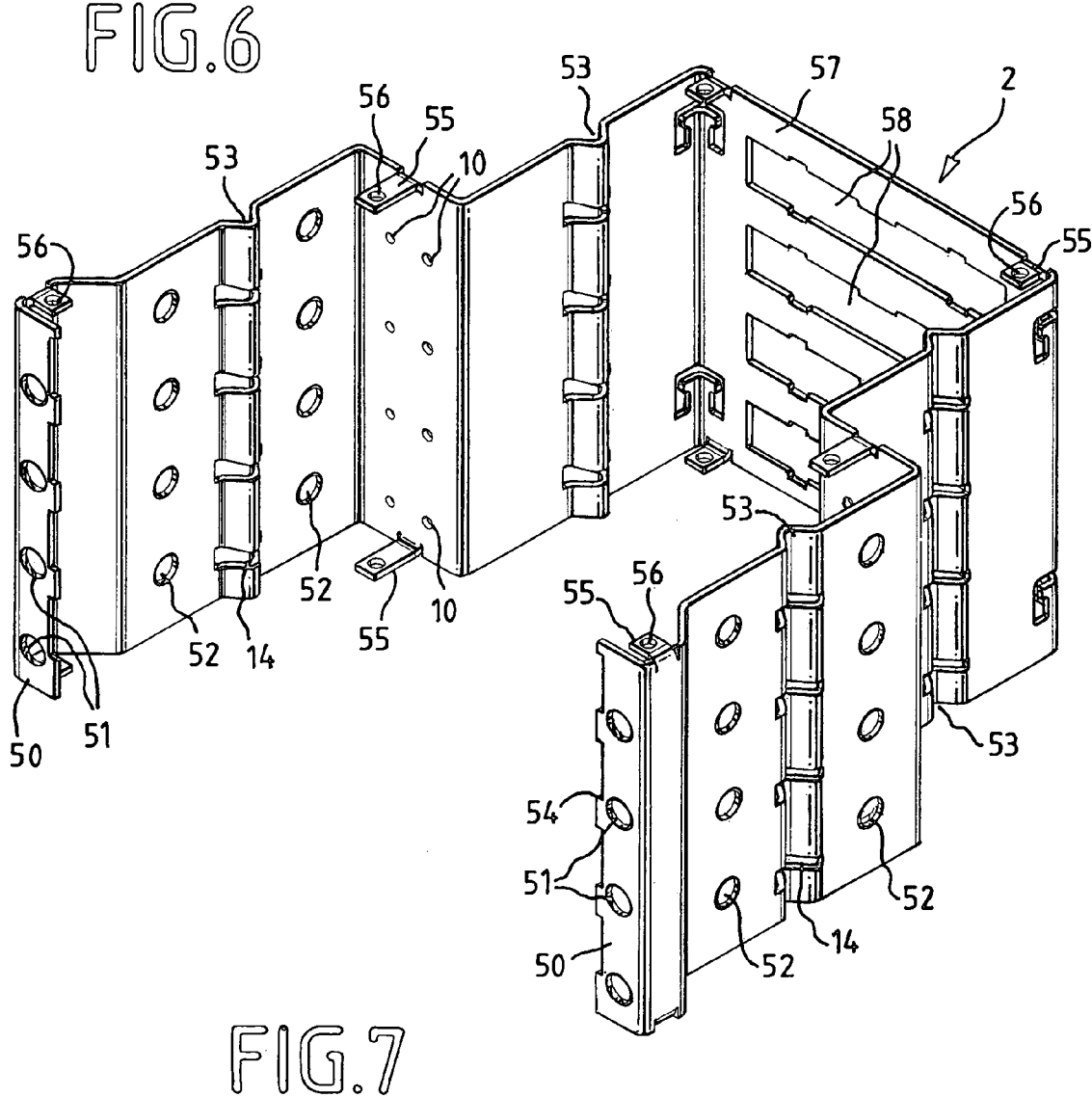
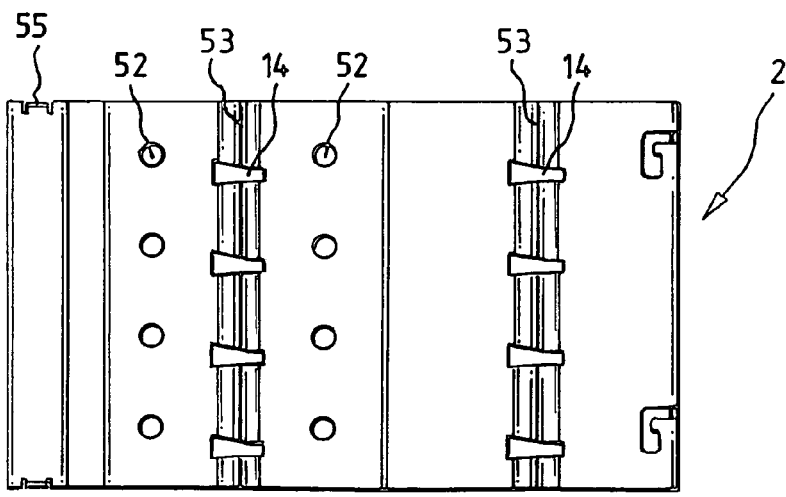

12);
DISTRIBUTION CONNECTING MODULE

BACKGROUND

Distribution board connection modules are used in main distribution boards or collocation distribution boards, for example, for telecommunications and data technology, and are used for connection and jumpering of incoming and outgoing cable conductors.

DE 100 29 649 A1 discloses a distribution board connection module for telecommunications and data technology, having a housing in which externally accessible input and output contacts are arranged for connection of lines or conductors, with the housing having a cavity in which functional elements are arranged between the input and output contacts. The input and output contacts are arranged on opposite end faces of the housing. The functional elements are arranged on at least one printed circuit board, which is supported in the housing. The input contacts are in the form of insulation-displacement terminal contacts, with the output contacts likewise being in the form of insulation-displacement terminal contacts, or an electrical plug connector. The insulation-displacement terminal contacts preferably have a fork-shaped contact, by means of which a force-fitting electrical connection can be produced with the functional elements. In this case, it has already been proposed for defective printed circuit boards to be replaced by pulling the fork-shaped contacts off the printed circuit board. The known embodiment has the disadvantage that this pulling-off process is rather difficult, since the fork-shaped contacts are connected to the printed circuit board by a force fit. Furthermore, the conductors must be removed for the pulling-off process, and must be reconnected again after replacement.

SUMMARY

The invention is therefore based on the technical problem of providing a distribution board connection module for telecommunications and data technology and which allows printed circuit boards to be replaced more easily.

For this purpose, the input and output contacts are detachably connected to the printed circuit board, with the connecting strip to which the input contacts are fitted being detachably connected via a front part to the housing, with the insulation-displacement terminal contacts being connected to the printed circuit board via fork contacts, and with the connection between the front part and the housing being designed such that, when the connection is detached, the connecting strip which is connected to the front part is moved together with the fork contacts away from the printed circuit board. This means that the force which is required to produce and detach the force-fitting connection between the printed circuit board and the fork contacts is applied by the connection between the front part and the housing. However, depending on the embodiment, this connection may be produced and detached very easily by means of tools. A further advantage is that, when there is a symmetrical connection between the front part and the housing, the force is also transmitted symmetrically and uniformly to the connecting strip. The fact that the handling involved in replacement of the printed circuit board is now very simple means that the distribution board connection module can be used universally and allows any desired changes or extensions to applications. It is thus possible on the one hand to use the module as a splitter for separation of the speech and data services for ADSL applications and to replace these as required if the customer subsequently wishes to have a VDSL application. The printed circuit board can likewise be reconfigured by means of a suitable layout for SDSL or for pure speech applications. Overvoltage protection, for example, can likewise be integrated easily by replacement of the printed circuit board.

In a further embodiment, the connection between the front part and the housing has at least one screw which is associated with the front part and one thread which is associated with the housing, with the screw being fixed to the front part. In this case, there are preferably two screws associated with the front part in order to achieve the symmetry which has already been described above. The fixing of the screw to the front part means that a screwing movement of the screw results in the front part and hence the connecting strip which is connected to it moving.

In a further preferred embodiment, the screw is fixed to the front part via a groove between the screw head and the thread but with the screw in this case preferably being connected to the front part such that it is held captive. For this purpose, the screw is inserted into an opening in the front part and is pushed with the groove into a narrowed area. The connecting strip is then passed through the opening and is latched to the front part.

In a further preferred embodiment, the housing has a stop, with the printed circuit board resting with its end face, which is associated with the input contacts, behind the stop in the inserted state. This prevents the printed circuit board from being moved out of the housing itself when the connection is detached. The printed circuit board is fixed by the stop, and the stop also absorbs the necessary opposing forces while the fork contacts are detached. In order to remove the printed circuit board it must then be raised slightly and pulled out.

In a further preferred embodiment, the side walls have guide slots for supporting the printed circuit board, with one edge of the guide slot being formed obliquely. In the embodiment with the stop, the printed circuit board must be held obliquely while being pushed in and out, in order that it can be guided over the stop. In embodiments without a stop, the guide slots may also be straight.

In a further preferred embodiment, the housing is formed from metal. In addition to RF shielding this also makes it simple to produce ground connections, when required.

In a further preferred embodiment, the base part and the cover of the housing are separated parts which can be connected to the side walls, with the connection preferably being a screw connection.

In a further preferred embodiment, the cover and/or the base part are/is formed from a spring steel sheet, with profiled forks being arranged on this spring steel sheet, by means of which the distribution board connection module can be latched onto profiled rods. In this embodiment, the cover and/or the base part are/is screwed to the side walls in the area of the profiled forks.

In a further preferred embodiment, spring contacts are arranged on the housing, are connected to the printed circuit board, and make a ground contact.

In a further preferred embodiment, the lower and upper profiled forks are formed from a sheet-metal part, which is preferably screwed to the side walls of the housing.

The spring contacts are then preferably also arranged on the sheet-metal part in order to produce a ground connection for the printed circuit board.

In a further preferred embodiment, the housing rear wall is detachably connected to the housing. This embodiment is preferably used when previously connected connecting strips are intended to be built up on the rear face. An alternative option is to design the housing rear wall with side slots, so that the connecting strips and plug connectors can be pushed in and latched from the side. If two or more such slots are required, then they are preferably introduced alternately on the left and right on the housing rear wall, in order to have as little adverse effect as possible on its mechanical robustness.

In one preferred embodiment, cable guides can be plugged into the side walls of the housing.

In a further preferred embodiment, each front part has two associated connecting strips, and one connecting strip or one plug connector is arranged on the opposite end face. This embodiment is preferably used for DSL applications in main distribution boards. In this case, the first connecting strip in the front part is associated with the POTS subscriber boards and the second connecting strip in the front part is associated with the subscriber, with the connecting strip and the plug connector being connected to the service provider.

In a further preferred embodiment, the contact elements of the connecting strips are mechanically supported in the connecting strips such that the connecting strips can be connected in advance to conductors outside the distribution board connection module. Once again, this means that it is possible to disconnect the fully connected connecting strip from the printed circuit board and to replace the printed circuit board without having to reconnect the conductors.

The invention now makes it possible to replace the printed circuit boards without interrupting the telephony service. To do this, one contact on the first connecting strip is in each case short-circuited to one contact on the second connecting strip via a short-circuiting link. The fully connected connecting strip can then be pulled off the printed circuit board by detaching the front part, without having to interrupt the telephony service.

BRIEF DESCRIPTION OF THE DRAWINGS

The invention will be explained in more detail below in the following text with reference to a preferred exemplary embodiment. In the figures:

FIG. 6 shows a perspective illustration of a housing without a cover and base part, FIG. 7 shows a side view of the housing side wall.

DETAILED DESCRIPTION

Figure 1:
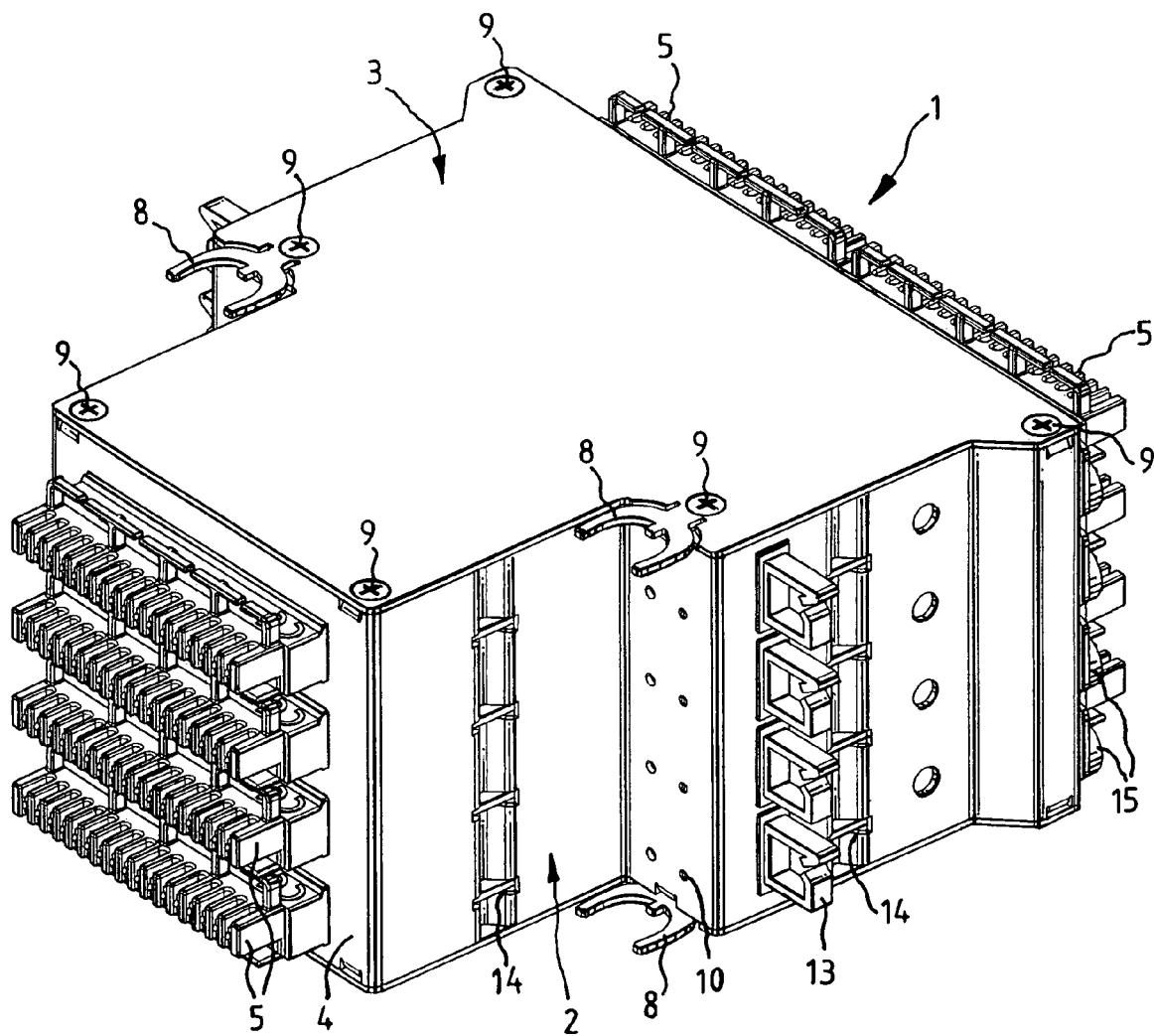
FIG. 1 shows a perspective rear view of a distribution board connection module.
Figure 2:
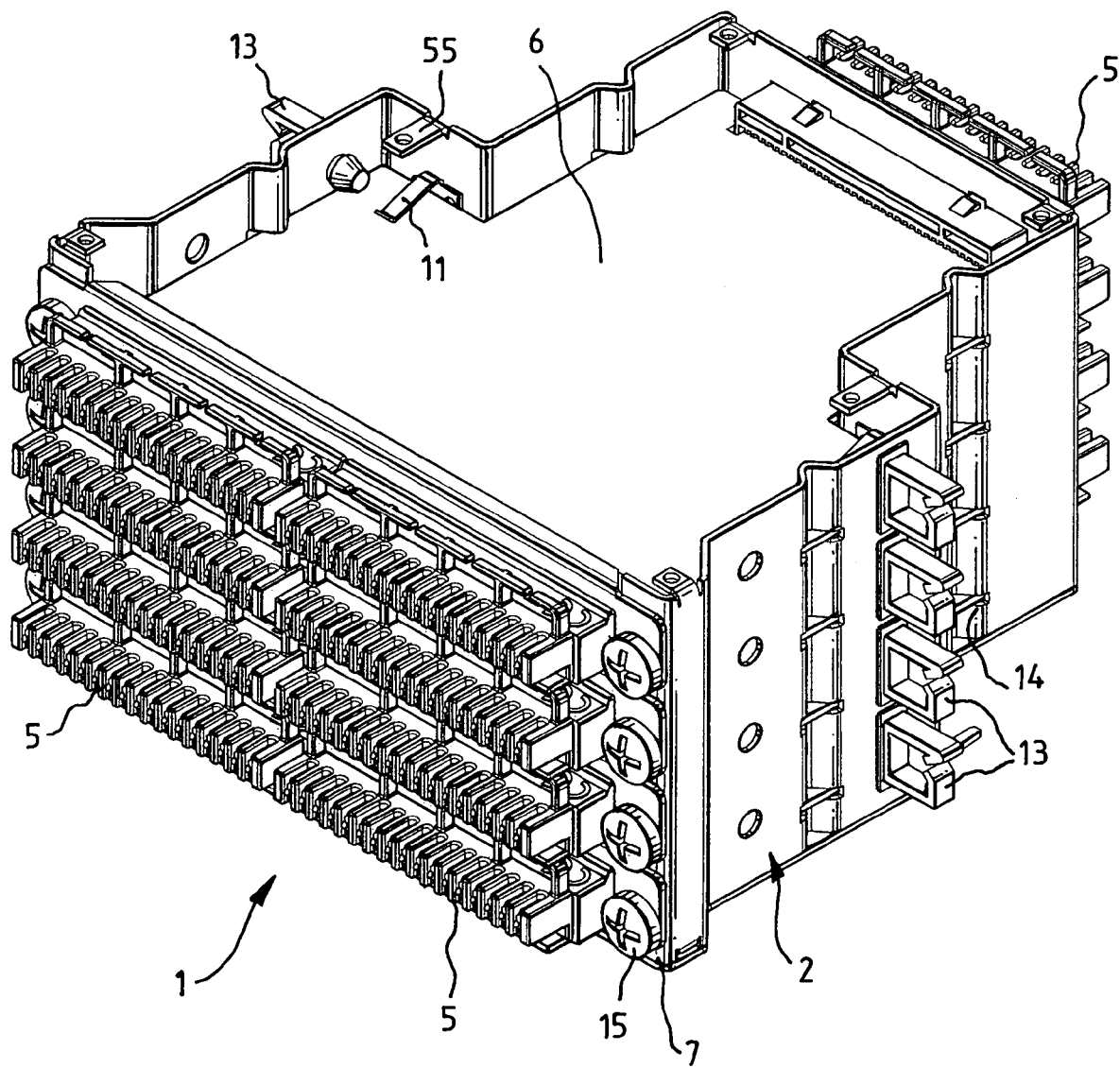
FIG. 2 shows a perspective front view of the distribution board connection module without a cover.

FIG. 1 shows a distribution board connection module 1 having a metallic housing 2 with a cover 3. Four connecting strips 5 are arranged one above the other on the rear face 4 of the housing 2, with each connecting strip 5 being in the form of an 8DA (double conductor) connecting strip. The connecting strips 5 are fitted with insulation-displacement terminal contacts which form the output contacts of the distribution board connection module 1. Four rows each having two connecting strips 5 which form the input contacts of the distribution board connection module 1 are arranged on the opposite end face. In this case, it should be noted that the expressions input and output contacts are used only for definition purposes, since signals may flow in both directions. There is a cavity in the interior of the distribution board connection module 1, in which printed circuit boards 6 are arranged, with at least one printed circuit board 6 in each case being arranged between one connecting strip 5 for the rear face and the two associated connecting strips 5 for the front face, as can be seen in FIG. 2. The connecting strips 5 on the front face which are in each case associated with one row are each connected via a front part 7 to the housing 2, as will be explained in more detail later. The cover 3 has two profiled forks 8, by means of which the distribution board connection module 1 can be latched onto profiled rods which are not illustrated. Two such profiled forks are likewise arranged on a base part which is not illustrated. In order to achieve adequate strength, the cover 3 and the base part are formed from sprung steel sheet, while in contrast the rest of the housing 2 may be formed from a simple stainless steel. The cover 3 and the base part are screwed to the housing 2 via screws 9, with at least one screw 9 being arranged in the area of each of the profiled forks 8. Furthermore, the housing 2 has openings 10 via which spring contacts 11 can be attached to the housing. The spring contacts 11 are preferably in the form of two leaf springs which are bent with respect to one another as is illustrated, by way of example, in FIG. 9. The leaf springs are bent away from one another in the front area, thus resulting in an opening area which makes it easier to push the printed circuit board 6 on. The opening areas are then adjacent to a contact area, where the two leaf springs are bent towards one another.

A ground connection from the printed circuit board 6 via the spring contacts 11 to the housing 2 to ground can then be provided via the spring contacts 11. This is of particular interest when protective elements such as surge arresters are arranged on the printed circuit board 6. The spring contacts 11 in this case preferably make contact with the printed circuit board 6 from the upper face and lower face, although in principle contact on one side is sufficient. The spring contacts 11 may in this case be arranged on both sides of the housing 2 or else on one side. This depends on the printed circuit board layout and on the current levels to be dissipated to ground. Furthermore, the housing 2 has holders for cable guides 13 and slotted guides 14 for the printed circuit board 6.

Figure 3:
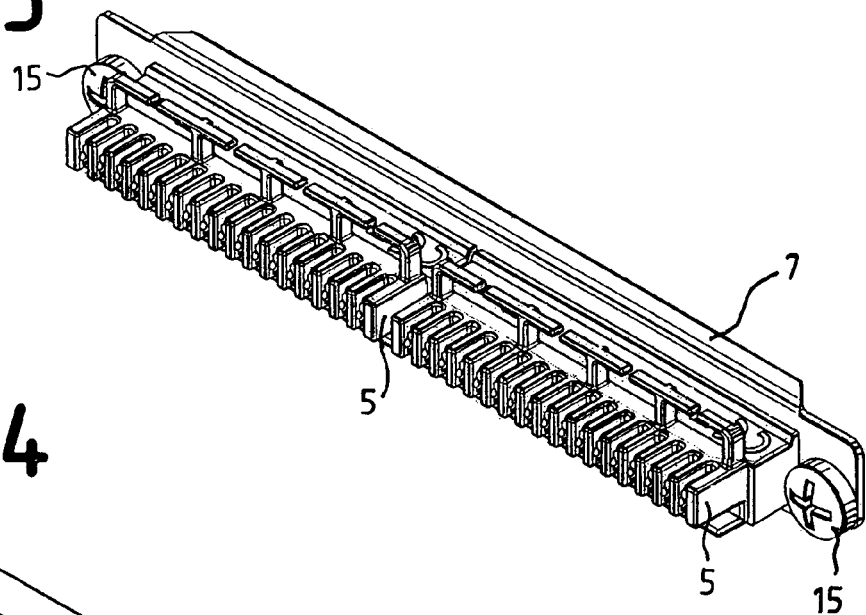
FIG. 3 shows a front part with two inserted connecting strips and screws.
Figure 4:
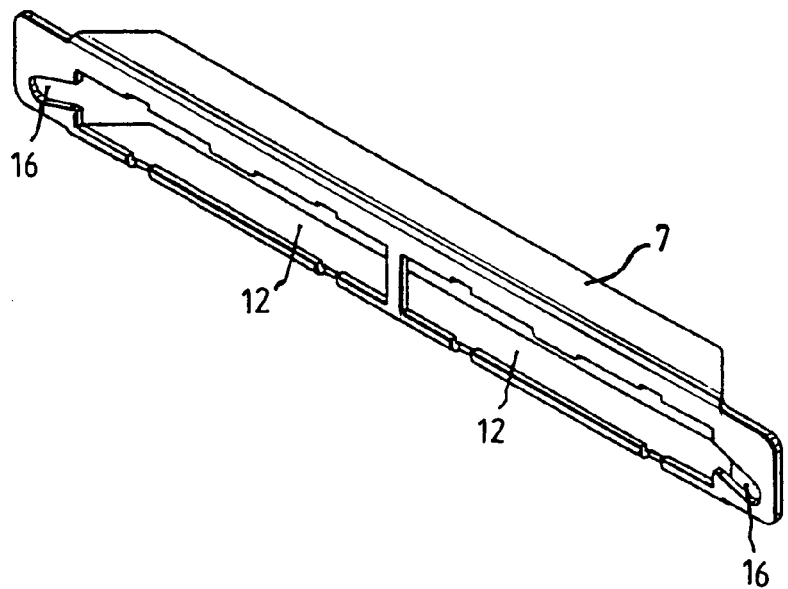
FIG. 4 shows the front part without connecting strips and screws.
Figure 5:
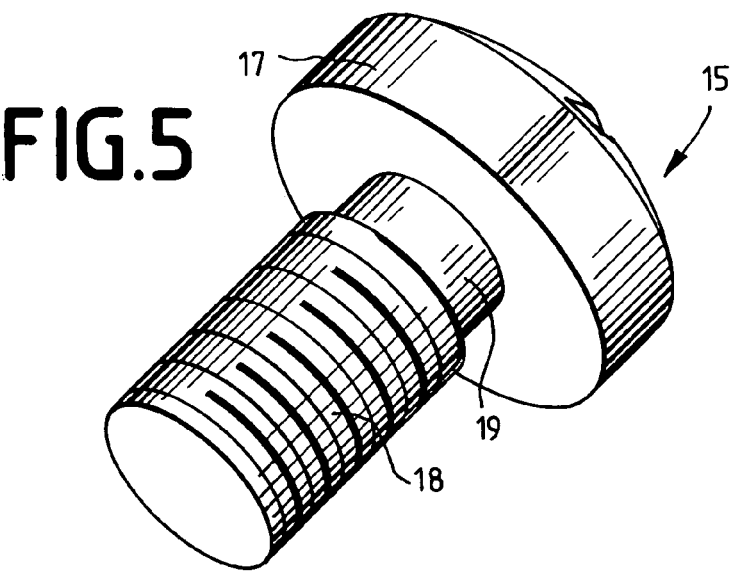
FIG. 5 shows a perspective illustration of a screw.

FIG. 3 shows a front part 7 with two inserted connecting strips 5 as well as two screws 15. As can be seen in particular in FIG. 4, the front part 7 has openings 12 into which the connecting strips 5 can be inserted and latched. There is a slotted area 16 adjacent to each of these openings 12, at the side. The screws 15 are formed with a groove 19 between the screw head 17 and the threaded part 18, with the diameter of the threaded part 18 being greater than the width of the slotted area 16, and the diameter in the area of the groove 19 being smaller than the width of the slotted area, as is illustrated in FIG. 5. The screw 15 can thus be inserted into the opening 12 for the connecting strips 5 and can be pushed along the groove 19 into the slotted area 16. When the connecting strips 5 are subsequently inserted and latched, then the two screws 15 are fixed to the front part 7 such that they are held captive, but are mounted such that they can rotate. This means that, when the screw 15 is rotated in an opposing thread, a movement of the screw 15 results in positive movement of the front part 7 and the connecting strips 5. Thus, when the screw 15 is screwed onto the opposing thread on the housing, the connecting strip 5 is moved towards the printed circuit board 6. The insulation-displacement terminal contacts are formed with fork contacts, which are pushed over the printed circuit board 6 and make contact with the printed circuit board 6.

Before the design of the housing is described in more detail, one preferred embodiment of the connecting strip 5 will first of all be explained in more detail with reference to FIGS. 10-12. These embodiments allow the connecting strips to be conductord up in advance, and to be connected to the printed circuit board retrospectively.

Figure 10:
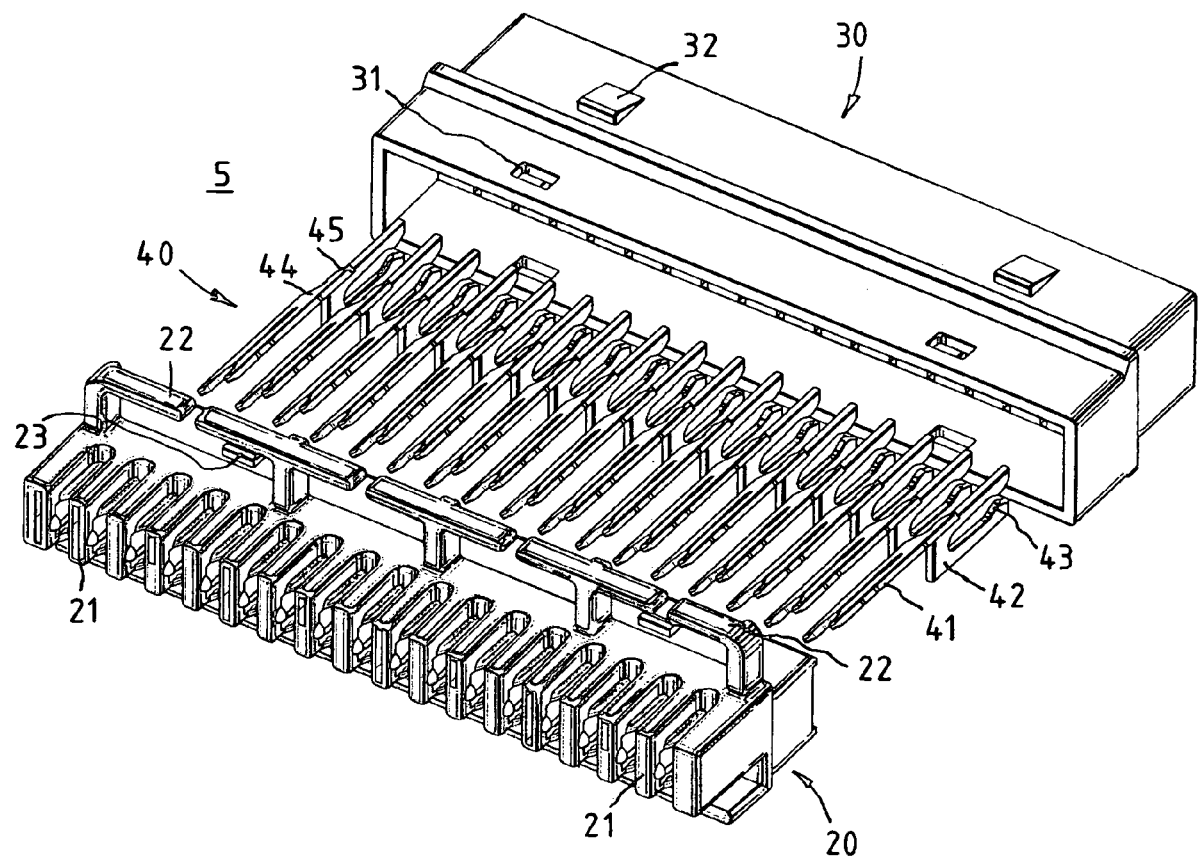
FIG. 10 shows a perspective exploded illustration of a connecting strip for printed circuit boards.

FIG. 10 shows a perspective illustration of the connecting strip 5. The connecting strip 5 has a first housing part 20, a second housing part 30 and a large number of contact elements 40. The first housing part 20 has clamping ribs 21, conductor guidance eyes 22 and latching tabs 23. The second housing part 30 has latching holders 31 and latching tabs 32. Furthermore, that part of the second housing part 30 which faces the printed circuit board forms a chamber-like area, on whose inner faces ribs 33 are arranged at the top and bottom, as can partially be seen in FIG. 12, with the ribs 33 being chamfered in the front area. The chamfering makes it easier to push the plug connector onto the printed circuit board. The contact elements 40 have an insulation-displacement terminal contact 41 and a fork contact 42, with the insulation-displacement terminal contact 41 and the fork contact 42 being rotated through about 45° with respect to one another. The fork contact 42 in each case has two rounded contact areas 43, which are curved inwards. The insulation-displacement terminal contacts 41 of the contact elements 40 are plugged into holders between the clamping ribs 21, where they are fixed mechanically. The second housing part 30 is then latched onto the first housing part 20, with the latching tabs 23 engaging in the latching holders 31. Furthermore, the contact elements 40 are mechanically supported on the lower edges 44 and/or lower edge 45 of the insulation-displacement terminal contacts 41 on mechanical stops, which cannot be seen, in the second housing part 30.

Figure 11:
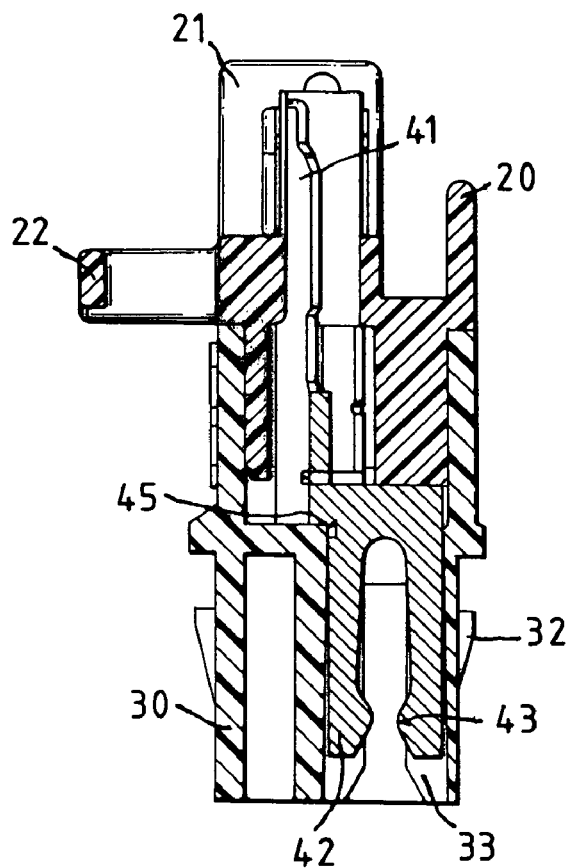
FIG. 11 shows a cross section through the assembled connecting strip.
Figure 12:
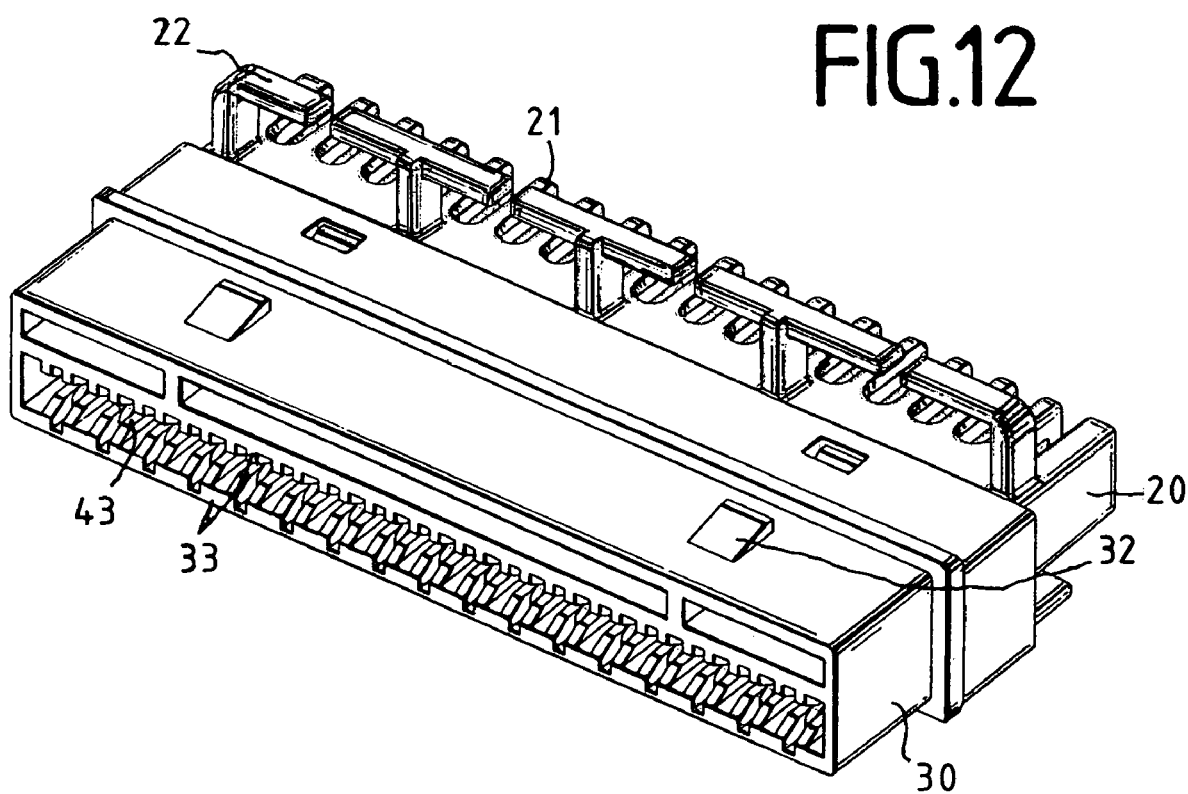
FIG. 12 shows a perspective rear view of the connecting strip.

This assembled state is illustrated in FIGS. 11 and 12. In this case, FIG. 11 shows a cross section through the connecting strip, with the cross section being located between two clamping ribs. As can be seen in particular in FIG. 11, the lower edge 45 rests on a stop on the second housing part 30. The contact elements 40 are in this case mechanically held in the connecting strip 5 such that they are held captive, so that, in this state, a conductor can be connected to an insulation-displacement terminal contact 41 without the connection forces being able to push the contact element 40 out. The mechanical connection forces are in this case absorbed by the mechanical stops in the second housing part 30. The height of the ribs 33 is designed such that the contact areas 43 project. This ensures that an adequate contact pressure is produced between the contact area 43 and a contact pad which is arranged on the printed circuit board.

Figure 8:
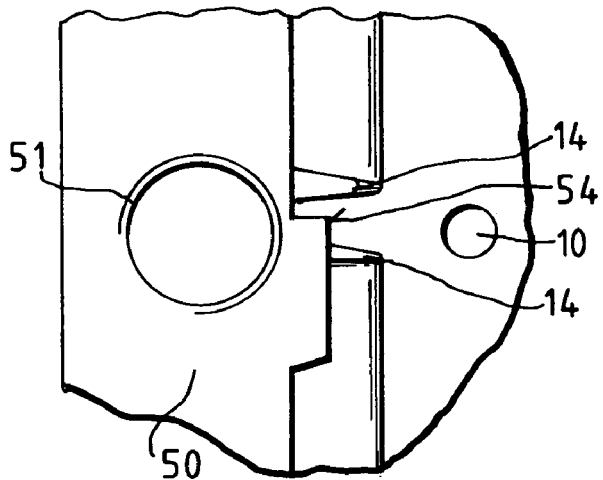
FIG. 8 shows a detailed illustration in the area of the thread for holding the screw.

FIG. 6 shows the housing 2 in perspective without a cover and base part. The housing 2 has two end surfaces 50 in the front area. Four threads 51 are incorporated in each end surface 50, into which the screws 15 can be screwed. There are openings 52 in the side walls, into which the cable guides 13 can be inserted. Furthermore, heat losses which are produced by the functional elements on the printed circuit board can be dissipated via the openings 52. Furthermore, openings 10 can be seen for the spring contacts. The side walls each have two indentations 53, in which the slotted guides 14 are incorporated, whose precise profile can be seen better in FIG. 7. This shows that the upper edge of the guide slot 14 runs obliquely downwards in order then to merge into a horizontal area. This allows a printed circuit to be guided obliquely upwards from the front face until it drops behind the stop 54. The stop 54 is illustrated in an enlaged form in FIG. 8. In this case, the stop 54 projects somewhat beyond the imaginary center line of the thread 51. In the inserted state, the printed circuit board then rests on the lower edge of the guide slot 14, so that its end face is located underneath the stop 54. In the central area, the housing has webs 55 which point inwards and have openings 56 with a thread, via which the cover and base part are screwed to the housing 2. The rear wall 57 has openings 58 which are similar to the openings 12 in the front part 7. The connecting strips 5 can then be inserted and latched into these openings 12.

Figure 9:
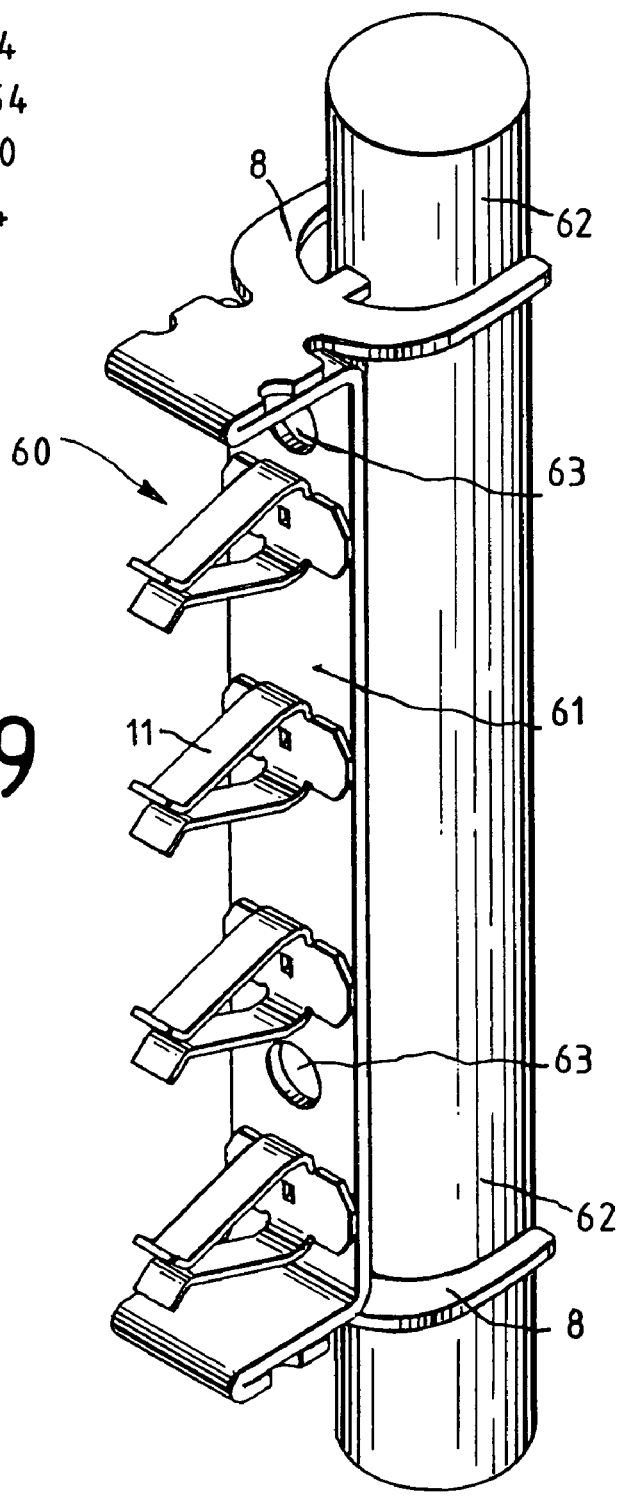
FIG. 9 shows a perspective illustration of a sheet-metal part with lower and upper profiled forks and spring contacts.

FIG. 9 shows one possible embodiment of a sheet-metal part 60, by means of which profiled forks 8 and spring contacts 11 can be produced in a common component. The profiled forks 8 are in this case bent in a U-shape in the rear area and then merge into a web 61, from which the spring contacts 11 originate. This U-shaped area can then absorb the bending forces which occur during latching onto the profiled rods 62, without the spring contacts 11 having to bend. The sheet-metal part 60 can then be screwed to the housing via the openings 63 in the web 61. In this embodiment, there is then no longer any need for the cover and base part to be composed of a sprung metal but, like the rest of the housing, they may be formed from simple stainless steel. In this case, it is also possible for the cover, the base part and the rest of the housing to be formed integrally.

LIST OF REFERENCE SYMBOLS

1) Distribution board connection module
2) Housing
3) Cover
4) Rear face
5) Connecting strip
6) Printed circuit board
7) Front part
8) Profiled forks
9) Screws
10) Opening
11) Spring contact
12) Openings
13) Cable guide
14) Slotted guide
15) Screw
16) Slotted area
17) Screw head
18) Threaded part
19) Groove
20) First housing part
21) Clamping rib
22) Conductor guidance eyes
23) Latching tabs
30) Second housing part
31) Latching holders
32) Latching tabs
33) Ribs
40) Contact element
41) Insulation-displacement terminal contact
42) Fork contact
43) Contact area
44) Lower edge
45) Lower edge 50) End surface
51) Thread
52) Opening
53) Indentation
54) Stop
55) Web
56) Opening
57) Rear wall
58) Opening
60) Sheet-metal part
61) Web
62) Profiled rod
63) Opening

The invention claimed is:

1. A distribution board connection module for telecommunications and data technology, comprising:
  a housing in which externally accessible input and output contacts for connection of lines and conductors are arranged, with the housing having a cavity in which at least one printed circuit board is arranged, with the input and output contacts being arranged on the opposite end faces of the housing, and with the input contacts being in the form of at least one connecting strip with insulation-displacement terminal contacts, wherein the input and output contacts are detachably connected to the printed circuit board, with the connecting strip to which the input contacts are fitted being detachably connected via a front part to the housing, with the insulation-displacement terminal contacts being connected to the printed circuit board via fork contacts, and with the connection between the front part and the housing such that, when the connection is detached, the connecting strip which is connected to the front part is moved together with the fork contacts away from the printed circuit board;
  wherein the housing has a stop behind which an end face of the printed circuit board rests when arranged within the housing and connected to the input contacts, wherein the stop inhibits removal of the printed circuit board from the housing when the front part is detached from the housing.

2. The distribution board connection module as claimed in claim 1, wherein the connection between the front part and the housing has at least one screw which is associated with the front part and one thread which is associated with the housing, with the screw being fixed to the front part.

3. The distribution board connection module as claimed in claim 2, wherein the screw is fixed to the front part via a groove between the screw head and the thread.

4. The distribution board connection module as claimed in claim 2, wherein the screw is connected to the front part such that it is held captive.

5. The distribution board connection module as claimed in claim 1, wherein side walls of the housing have guide slots for supporting the printed circuit board, with one edge of each guide slot being formed obliquely.

6. The distribution board connection module as claimed in claim 1, wherein the housing is composed of metal.

7. The distribution board connection module as claimed in claim 1, wherein the housing includes side walls, a base part, and a cover, wherein the base part and the cover of the housing are separate parts connected to the side walls.

8. The distribution board connection module as claimed in claim 7, wherein at least one of the cover and the base part are formed from a spring steel sheet, with profiled forks being arranged on this spring steel sheet, wherein the distribution board connection module can be latched onto at least one profiled rod with the profiled forks.

9. The distribution board connection module as claimed in claim 8, wherein at least one of the cover and the base part are screwed to the side walls in the area of the profiled forks.

10. The distribution board connection module as claimed in claim 6, wherein spring contacts are arranged on the housing, are connected to the printed circuit board, and make a ground contact.

11. The distribution board connection module as claimed in claim 10, wherein lower and upper profiled forks are formed from a sheet-metal part, wherein the distribution board connection module can be latched onto a profiled rod with the profiled forks.

12. The distribution board connection module as claimed in claim 11, wherein the sheet-metal part is screwed to the housing.

13. The distribution board connection module as claimed in claim 12, wherein the spring contacts are connected to the sheet-metal part.

14. The distribution board connection module as claimed in claim 1, wherein a housing rear wall is detachably connected to a remainder of the housing.

15. The distribution board connection module as claimed in claim 1, wherein a housing rear wall has side slots into which connecting strips to which the output contacts are fitted can be inserted and latched from the side.

16. The distribution board connection module as claimed in claim 1, wherein cable guides can be plugged into side walls of the housing.

17. The distribution board connection module as claimed in claim 1, wherein the front part has two associated connecting strips, and one connecting strip is arranged on the opposite end face from the front part.

18. The distribution board connection module as claimed in claim 1, wherein the insulation-displacement terminal contacts of the connecting strip are mechanically supported in the connecting strip such that the connecting strip can be connected in advance to conductors outside the distribution board connection module.

19. A distribution board connection module for telecommunications and data technology, comprising:
  a housing in which externally accessible input and output contacts for connection of lines and conductors are arranged, with the housing having a cavity;
  a plurality of printed circuit boards arranged in a stack inside the cavity;
  wherein the input and output contacts are arranged on opposite end faces of the housing;
  wherein the input and output contacts are in the form of a plurality of connecting strips with insulation-displacement terminal contacts;
  wherein the input and output contacts are detachably connected to the plurality of printed circuit boards;
  wherein the insulation-displacement terminal contacts of each connecting strip are connected to one of the plurality of printed circuit boards via fork contacts;
  wherein the connecting strips to which the input contacts are fitted are detachably connected via one of a plurality of front parts to the housing;
  wherein the connection between each front part and the housing is such that, when the connection is detached, each connecting strip which is connected to the front part is moved together with the fork contacts away from the printed circuit board;
  wherein the housing includes a plurality of stops, wherein an end face of each printed circuit board rests against one of the stops when the respective printed circuit board is arranged within the housing and connected to one of the connecting strips of the input contacts, wherein each stop inhibits removal of the respective printed circuit board from the housing when the front part is detached from the housing.

20. The distribution board connection module as claimed in claim 19, wherein the connection between the front parts and the housing has at least one screw which is associated with each front part and one thread which is associated with the housing, with the screw being fixed to the front part.

21. The distribution board connection module as claimed in claim 20, wherein the screw is fixed to the front part via a groove between the screw head and the thread.

22. The distribution board connection module as claimed in claim 20, wherein the screw is connected to the front part such that it is held captive.

23. The distribution board connection module as claimed in claim 19, wherein side walls of the housing have guide slots for supporting the printed circuit boards, with one edge of each guide slot being formed obliquely.

24. The distribution board connection module as claimed in claim 19, wherein the housing is composed of metal.

25. The distribution board connection module as claimed in claim 19, wherein the housing includes side walls, a base part, and a cover, wherein the base part and the cover of the housing are separate parts connected to the side walls.

26. The distribution board connection module as claimed in claim 25, wherein the cover and the base part are each formed from a spring steel sheet, with profiled forks being arranged on the spring steel sheets, wherein the distribution board connection module can be latched onto profiled rods with the profiled forks.

27. The distribution board connection module as claimed in claim 26, wherein the cover and the base part are screwed to the side walls in the area of the profiled forks.

28. The distribution board connection module as claimed in claim 24, wherein spring contacts are arranged on the housing, are connected to the printed circuit boards, and make a ground contact.

29. The distribution board connection module as claimed in claim 28, wherein lower and upper profiled forks are formed from a sheet-metal part, wherein the distribution board connection module can be latched onto a profiled rod with the profiled forks.

30. The distribution board connection module as claimed in claim 29, wherein the sheet-metal part is screwed to the housing.

31. The distribution board connection module as claimed in claim 30, wherein the spring contacts are connected to the sheet-metal part.

32. The distribution board connection module as claimed in claim 19, wherein a housing rear wall has side slots into which the connecting strips to which the output contacts are fitted are inserted into and latched from the side.

33. The distribution board connection module as claimed in claim 19, wherein cable guides can be plugged into side walls of the housing.

34. The distribution board connection module as claimed in claim 19, wherein each front part has two associated connecting strips connected to one printed circuit board, each printed circuit board connected to one connecting strip to which the output contacts are fitted.

35. A distribution board connection module for telecommunications and data technology, comprising:
  a housing in which externally accessible input and output contacts for connection of lines and conductors are arranged, with the housing having a cavity in which at least one printed circuit board is arranged, with the input and output contacts being arranged on the opposite end faces of the housing, and with the input contacts being in the form of at least one connecting strip with insulation-displacement terminal contacts, wherein the input and output contacts are detachably connected to the printed circuit board, with the connecting strip to which the input contacts are fitted being detachably connected via a front part to the housing, with the insulation-displacement terminal contacts being connected to the printed circuit board via fork contacts, and with the connection between the front part and the housing such that, when the connection is detached, the connecting strip which is connected to the front part is moved together with the fork contacts away from the printed circuit board;
  wherein the housing has a stop, with the printed circuit board resting with its end face, which is associated with the input contacts, behind the stop in the inserted state; and
  wherein side walls of the housing have guide slots for supporting the printed circuit board, with one edge of the guide slot being formed obliquely.

36. A distribution board connection module for telecommunications and data technology, comprising:
  a housing in which externally accessible input and output contacts for connection of lines and conductors are arranged, with the housing having a cavity; and
  a plurality of printed circuit boards arranged in a stack inside the cavity;
  wherein the input and output contacts are arranged on opposite end faces of the housing;
  wherein the input and output contacts are in the form of a plurality of connecting strips with insulation-displacement terminal contacts;
  wherein the input and output contacts are detachably connected to the plurality of printed circuit boards;
  wherein the insulation-displacement terminal contacts of each connecting strip are connected to one of the plurality of printed circuit boards via fork contacts;
  wherein the connecting strips to which the input contacts are fitted are detachably connected via one of a plurality of front parts to the housing;
  wherein the connection between each front part and the housing is such that, when the connection is detached, each connecting strip which is connected to the front part is moved together with the fork contacts away from the printed circuit board;
  wherein the housing has a plurality of stops, with the printed circuit boards resting their end faces, which are associated with the input contacts, behind the stops in the inserted state; and
  wherein side walls of the housing have guide slots for supporting the printed circuit boards, with one edge of the guide slot being formed obliquely.

37. A distribution board connection module for telecommunications and data technology, comprising:
  a housing extending from a first side to a second side, the housing defining a cavity and a plurality of stops;
  a plurality of printed circuit boards arranged within the cavity of the housing, an end face of each of the printed circuit boards being configured to slide over, drop behind, and rest against a corresponding one of the stops when the printed circuit board is inserted into the housing;

a plurality of externally accessible output contacts arranged on the second side of the housing to be detachably coupled to corresponding ones of the printed circuit boards; and a plurality of connecting strips detachably coupled to the first side of the housing, each connecting strip holding a plurality of input contacts having fork contacts configured to couple to one of the printed circuit boards when the connecting strip is coupled to the housing, the fork contacts also being configured to detach from the respective printed circuit board when the respective connecting strip is detached from the housing, wherein the stops inhibit removal of the printed circuit boards from the housing in a first direction when the connecting strips are detached from the housing in the first direction.

* * * * *